March 18, 1941.                R. F. KNAACK                2,235,766
                              THERMAL ALARM
                           Filed Sept. 14, 1938
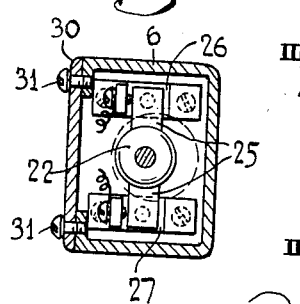
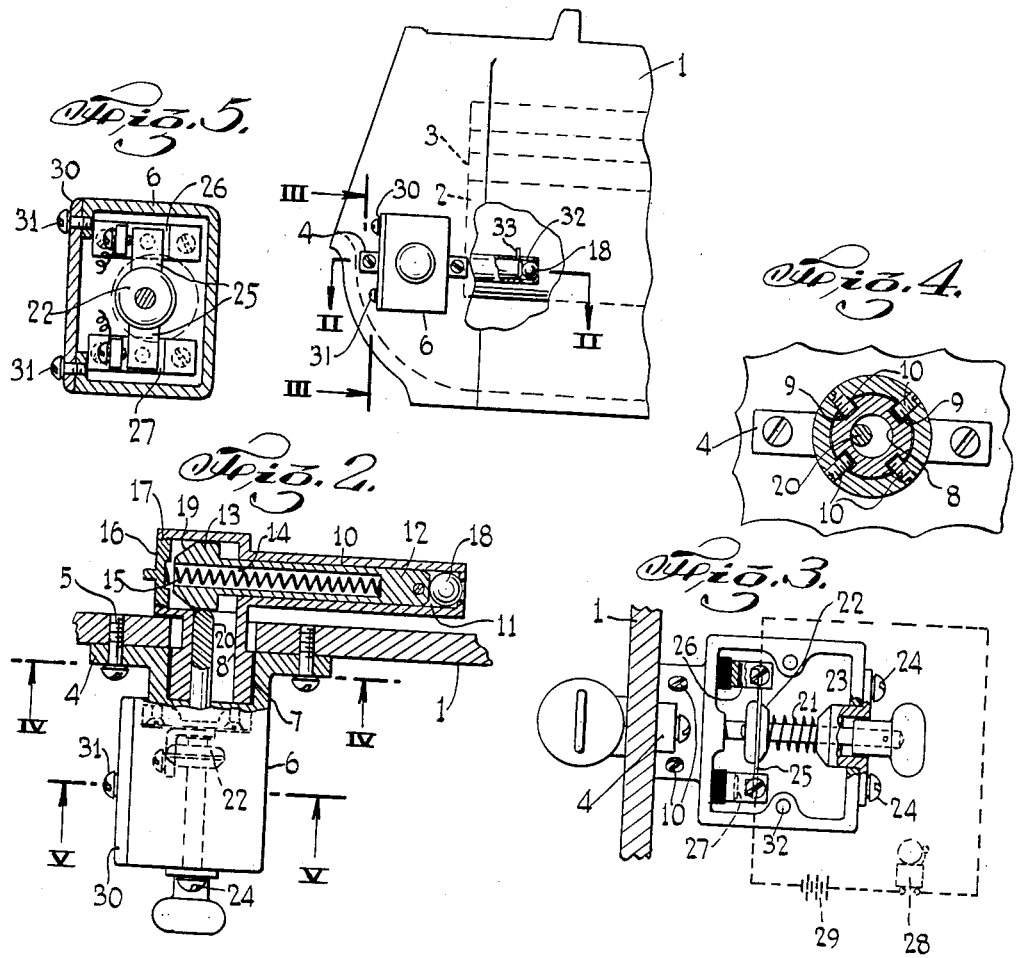
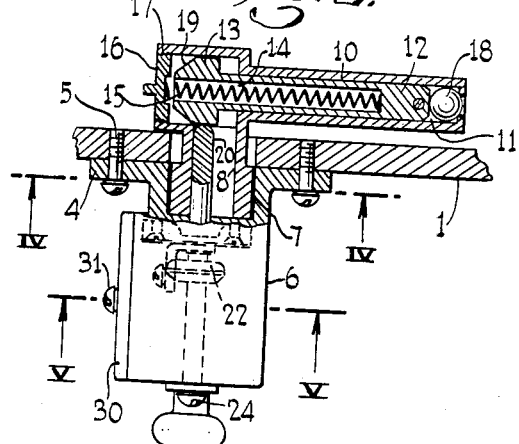
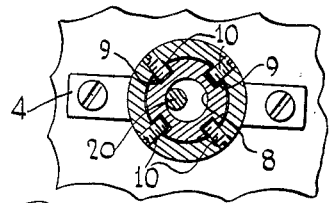
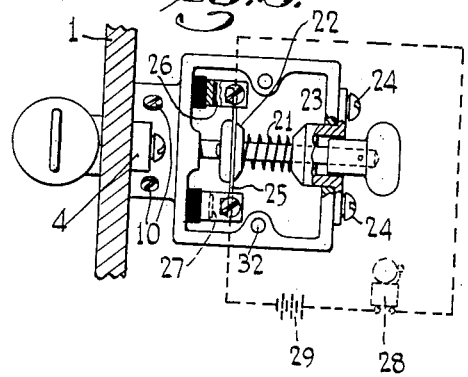
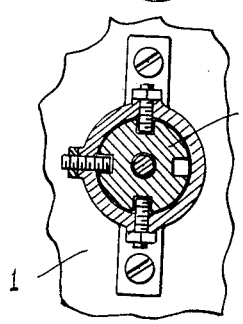
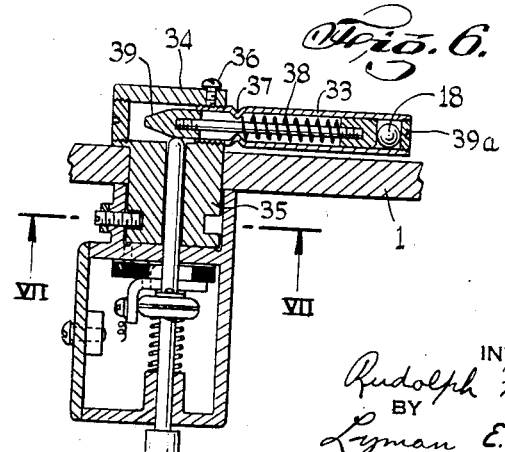
INVENTOR
Rudolph F. Knaack
BY
Lyman E. Dodge
ATTORNEY Patented Mar. 18, 1941

2,235,766

UNITED STATES PATENT OFFICE 2,235,766

THERMAL ALARM

Rudolph F. Knaack, Brunswick, N. Y., assignor to Consolidated Car Heating Company, Inc., Albany, N. Y., a corporation of New York Application September 14, 1938, Serial No. 229,840

3 Claims. (Cl. 200—142)

This invention relates to heat responsive devices, particularly heat responsive devices designed to give an alarm upon an undesired rise in temperature, and more especially such devices especially applicable for giving an alarm upon overheating occurring in a journal, journal bearing, or journal box.

A principal object of this invention is the provision of a device of the type specified which will be extremely simple in construction, inexpensive to manufacture, adapted to be installed in place with the minimum of changes in the device to which it is applied, permanent in adjustment, and free from undue maintenance requirements.

Other objects and advantages will appear as the description of the particular physical embodiments selected to illustrate the invention progresses and the novel features will be particularly pointed out in the appended claims.

In describing the particular physical embodiments selected to illustrate the invention, reference will be had to the accompanying drawing and the characters of reference thereon in which like characters of reference designate like parts throughout the several views, and in which:

Fig. 1 is a fragmentary side elevation view of a railroad car axle journal box with my invention applied thereto; Fig. 2 is a partly plan and a partly cross-sectional view on the plane indicated by the line II—II of Fig. 1 viewed in the direction of the arrows at the ends of the line; Fig. 3 is a cross-sectional view on the plane indicated by the line III—III of Fig. 1 viewed in the direction of the arrows at the ends of the line; Fig. 4 is a cross-sectional view on the plane indicated by the line IV—IV of Fig. 2 viewed in the direction of the arrows at the ends of the line; Fig. 5 is a cross-sectional view on the plane indicated by the line V—V of Fig. 2 viewed in the direction of the arrows at the ends of the line; Fig. 6 is a cross-sectional view corresponding to the view shown by Fig. 2 but showing a modified form of the device; Fig. 7 is a cross-sectional view on the plane indicated by the line VII—VII of Fig. 6 viewed in the direction of the arrows at the ends of the line.

Mechanical engineers are well aware that journals and the bearing thereof frequently become unduly heated from many causes, especially the lack of oil. In many situations such heating is extremely dangerous. This is especially so in the case of the journals and journal bearings which are formed on the ends of railway car axles. For this reason, applicant has illustrated his hot box alarm in connection with a railway car axle.

In Fig. 1 is shown the ordinary, well known and conventional box used to surround the end of the axle of a railway car at the point where it is journaled in bearings, the axle of journal being designated 2 and bearing 3.

Applicant's hot bearing alarm is preferably attached to a side of the box 1, best shown in Fig. 2. It may be attached in any suitable or appropriate manner as by a flange 4 orificed to receive cap screws, as 5 which are screw threaded into the wall of the box 1.

The flange 4 is integral with and supports the hollow terminal box 6. This terminal box at its inner end is provided with a cylindrical bore 8 in which is positioned a trunnion 7. This trunnion is formed with a plurality of peripheral cavities as 9, shown in Fig. 2 and also in Fig. 4. These peripheral cavities 9 serve for the reception of set screws as 10 which are screw threaded, as at 11, through the wall of the circuit chamber 6, serve to hold the trunnion positioned in the bore 7 and to prevent the trunnion from moving endwise.

The trunnion is extended on the opposite side of the side wall of the box 1 from that upon which the circuit breaker or terminal box is positioned and is extended both to the right and to the left of the trunnion to form a fusible element plunger box 10. At one end of the fusible element plunger box, that is, the right hand end as viewed in Fig. 2, the fusible body or pellet, preferably in the form of a sphere, is positioned and held in place by the end of the fusible element plunger box which has a hole therethrough of such size that it prevents the fusible element from passing through when it is intact, but, allows the fusible element as molten metal to pass therethrough.

Within the fusible element plunger box 10 is formed a stem portion bore 11 within which is positioned the stem 12 of the fusible element plunger, the fusible element plunger being of such size as to substantially fit the bore 11 but be easily slidable endwise therein.

The stem 12 has formed therewith a head 13 and both head and stem have a central bore 14 which receives a spring 15, one end of which rests against the bottom of the bore and the other end of which rests against the head 16 which is securely attached to the fusible element plunger box in any suitable or appropriate manner, as by screw threads 17.

While the fusible element or pellet 18 is intact the stem 12 and head 13 are in the position as shown by Fig. 2 but, if the fusible element 18 becomes melted by reason of an undesired heat in the box 10 then the stem 12 together with 13 are moved to the right, as viewed in Fig. 2, bringing the sloping end face 19 of the head 13 in position under the circuit breaker plunger 20.

When the head 13 brings its sloping face 19 under the circuit breaker plunger 20, that plunger is then moved forwardly, as viewed in Fig. 2, by the action of spring 21, as shown in Fig. 3. This spring 21 is positioned surrounding the plunger 20 and between circuit spring holder 22 which is attached to plunger 20 and plunger handle receptacle 23 securely fastened to the circuit breaker box 6 in any suitable or appropriate manner as by screws 24.

When spring 21 forces plunger 20 forwardly, as shown in Fig. 2, it causes circuit spring 25 to contact at one end with contact or terminal 26 and at the other end with contact 27 thereby completing an electric circuit between these electrically isolated terminals.

When terminals 26 and 27 are connected, an alarm is sounded. This alarm may consist of an ordinary electric trembling bell 28 connected to the terminal and including a source of electromotive force 29.

The left hand side of the circuit breaker box 6, as viewed in Fig. 2, is removable, that is, the side 30 is attached to the remainder of the box in any suitable or appropriate manner, as by screws 31, screw threaded into the ears as 32.

In normal use, the device is attached to a box 1, as shown, and then the fusible pellet 18 is inserted into the bore 11 through a hole 32 formed in the top of the fusible element plunger chamber. This is done by grasping manually operable pin 33 attached to the stem 22 and moving it, together with the stem 22, to the left as viewed in Fig. 1, the wall being slotted to allow such movement. Then the fusible pellet 18 is dropped into place, and the manually operable pin 33 released, whereupon the spring 15 moves the stem 22 against the pellet 18 and holds it in place.

If anything becomes defective within the plunger box 10 the head 16 is unscrewed and the various parts may be removed through the orifice thereby made.

The right hand end, as viewed in Fig. 2, of the fusible element plunger box 10 is positioned in close proximity to the journal 2 and the bearing 3 and if these become unduly heated, the fusible element 18 is melted and runs out through the hole in the end of the box 10, and the spring 15 moves the stem 12 and head 13 toward the right hand, as viewed in Fig. 2, thereby allowing the plunger to move forward as viewed in Fig. 2 and complete the circuit through 26 and 27 thereby sounding the alarm 28, whereby notice is given of the dangerous condition. After the dangerous condition has been removed, the apparatus is returned to the condition as shown by Fig. 2 by the insertion of a fresh pellet 18 in the box 10.

In the modification shown by Figs. 6 and 7 the main difference is that the fusible element chamber 33 is screw threaded into the extension 34 of the trunnion 35 and is held therein in fixed position by the screw 36. The plunger box 33 is formed with a circumferential inwardly extending rib 37 which serves as the shoulder for the retracting spring 38 which moves the head 39 to the right, as viewed in Fig. 6, when the fusible member 18 is melted.

In the form of device as shown by Fig. 6 and Fig. 7, the fusible member 18 is put in place by inserting it in the end of the chamber 33 after which the cap 39 is screw threaded into the end of box 33.

Although I have particularly described one particular physical embodiment of my invention and explained the operation, construction and principle thereof, nevertheless I desire to have it understood that the form selected is merely illustrative, but does not exhaust the possible physical embodiments of the idea of means underlying my invention.

What I claim as new and desire to secure by Letters Patent of the United States, is:

1. In a hot journal alarm, in combination: a hollow casing formed with an orificed flange adapted for attachment to a side of a journal box formed with an orifice therein, said casing formed with a cylindrical bore; a trunnion fitting into the cylindrical bore; means for retaining the trunnion in the cylindrical bore, said trunnion formed with a through bore; a plunger casing formed integrally with the trunnion, said plunger casing formed with an elongated bore and a hole through the wall thereof for the insertion of a fusible pellet; a plunger positioned and fitting the bore of the plunger casing and abutting at one end against the fusible pellet and having a cavity therein extending longitudinally thereof and having at one end an enlarged head with a sloping end face; a spring positioned within the cavity of the plunger and bearing at one end against the bottom thereof; a head attached to the plunger casing and forming an abutment for the other end of the spring; a spring biased circuit controlling plunger extending through the trunnion and bearing upon the head of the plunger, said circuit controlling plunger bearing a circuit spring adapted to connect two separated contact terminals and two separated contact terminals for cooperation with the said circuit spring.

2. In a hot journal alarm, in combination: a fusible pellet; a manually operable pin; a fusible element plunger box formed with an elongated bore and with a hole through its wall for the insertion of said fusible pellet and with an end wall formed with a through hole and a slot for the reception of a manually operable pin and a removable head at the end opposite the end formed with a through hole; said fusible pellet positioned in the end formed with a through hole; a plunger positioned in the elongated bore having one end bearing against the fusible pellet, said plunger formed with an elongated cavity therein and an enlarged head with a sloping face; a spring positioned with one end on the bottom of the cavity of the plunger and the other end on the head of the plunger box; said manually operable pin connected to the plunger and protruding through the wall of the plunger box whereby the plunger may be moved longitudinally against the bias of the spring for the purpose of inserting the fusible pellet through the hole in the wall of the plunger box; a circuit controlling plunger having one end positioned bearing against enlarged head of the plungers and means biasing the circuit plunger toward the head whereby when the head is moved so as to bring the sloping face opposite the circuit plunger for giving an alarm, the plunger is moved.

3. In a hot journal alarm, in combination: a hollow casing formed with an orificed flange for attachment to a journal box, said casing formed with a trunnion bore; a removable cover for the casing; means for attaching the cover to the casing; two electrically isolated contact terminals mounted within the casing; a bridging circuit spring within the casing; a reciprocable circuit plunger supporting the circuit spring; a manually operable handle for reciprocating the plunger manually; a spring surrounding the plunger and biasing the plunger in a direction to cause the circuit spring to connect the two separated contact terminals and means including a fusible element and a plunger formed with a sloping face for positioning the circuit plunger whereby the circuit spring will not connect the separate contact terminals and whereby upon the melting of the fusible element the biasing spring may move the circuit spring so as to connect the separated contact terminals.

RUDOLPH F. KNAACK